United States Patent
Gupta et al.

(10) Patent No.: US 12,399,977 B2
(45) Date of Patent: Aug. 26, 2025

(54) STATIC ANALYSIS CORRELATION SCANNERS

(71) Applicant: Snowflake Inc., Bozeman, MT (US)

(72) Inventors: Rishabh Gupta, San Francisco, CA (US); Hrushikesh Shrinivas Paralikar, Hayward, CA (US); Ryan Charles Quistorff, Bellevue, WA (US); Sasha Leila Ronaghi, Irvine, CA (US)

(73) Assignee: Snowflake Inc., Bozeman, MT (US)

( * ) Notice: Subject to any disclaimer, the term of this patent is extended or adjusted under 35 U.S.C. 154(b) by 145 days.

(21) Appl. No.: 18/524,999

(22) Filed: Nov. 30, 2023

(65) Prior Publication Data

US 2024/0273179 A1  Aug. 15, 2024

Related U.S. Application Data

(63) Continuation-in-part of application No. 18/168,852, filed on Feb. 14, 2023, now Pat. No. 12,001,552.

(51) Int. Cl.
 *G06F 21/51* (2013.01)
 *G06F 21/56* (2013.01)
 *G06F 21/57* (2013.01)

(52) U.S. Cl.
 CPC ............ *G06F 21/51* (2013.01); *G06F 21/562* (2013.01); *G06F 21/577* (2013.01); *G06F 2221/033* (2013.01)

(58) Field of Classification Search
 CPC .......... G06F 21/51; G06F 21/56; G06F 21/57; G06F 21/562; G06F 21/577; G06F 2221/033
 See application file for complete search history.

(56) References Cited

U.S. PATENT DOCUMENTS

| 8,302,193 B1 | 10/2012 | Gardner et al. |
| 12,001,552 B1 | 6/2024 | Carru et al. |

(Continued)

FOREIGN PATENT DOCUMENTS

| CN | 118536114 A | * | 8/2024 | ......... H04L 67/1097 |
| EP | 4390740 A1 | * | 6/2024 | ........... G06F 21/577 |

OTHER PUBLICATIONS

"U.S. Appl. No. 18/168,852, Final Office Action mailed Sep. 22, 2023", 16 pgs.

(Continued)

*Primary Examiner* — Jayesh M Jhaveri
(74) *Attorney, Agent, or Firm* — Schwegman Lundberg & Woessner, P.A.

(57) ABSTRACT

An anti-abuse scanning system and method for an application deployment platform is provided. In some examples, when a provider submits a new application package, a scan scheduler periodically polls for and detects the new submission. An anti-abuse scan service parses the installer script to determine dependencies between a primary application source code scan, and secondary container image scans. The primary and secondary scans are queued by writing records to status tables. A scan manager polls the tables, detects pending scans, and invokes scanner services to analyze the application files and container images based on configured rules. An image service extracts and uploads container images. The anti-abuse scan service aggregates the primary and secondary scan results to determine an overall verdict for the application package. In some examples, the verdict can be an automatic approval, automatic rejection, or trigger a manual review.

30 Claims, 11 Drawing Sheets

(56) References Cited

U.S. PATENT DOCUMENTS

| | | | |
|---|---|---|---|
| 2005/0240999 A1* | 10/2005 | Rubin | G06F 21/563 726/22 |
| 2010/0107257 A1* | 4/2010 | Ollmann | G06F 21/566 707/E17.014 |
| 2014/0082729 A1 | 3/2014 | Shim et al. | |
| 2015/0163232 A1 | 6/2015 | Liao | |
| 2015/0261954 A1 | 9/2015 | Xue | |
| 2017/0351862 A1 | 12/2017 | Mohinder et al. | |
| 2018/0139216 A1 | 5/2018 | Rasanen et al. | |
| 2020/0082094 A1* | 3/2020 | Mcallister | G06F 8/77 |
| 2021/0319108 A1 | 10/2021 | Segal et al. | |
| 2023/0017989 A1 | 1/2023 | Shi | |
| 2023/0177156 A1 | 6/2023 | Jung et al. | |
| 2024/0281530 A1 | 8/2024 | Carru et al. | |

OTHER PUBLICATIONS

"U.S. Appl. No. 18/168,852, Non Final Office Action mailed Jun. 2, 2023".

"U.S. Appl. No. 18/168,852, Response filed Aug. 31, 2023 to Non Final Office Action mailed Jun. 2, 2023", 10 pgs.

"U.S. Appl. No. 18/650,636, Non Final Office Action mailed Dec. 4, 2024", 8 pages.

"U.S. Appl. No. 18/650,636, Response filed Jan. 17, 2025 to Non Final Office Action mailed Dec. 4, 2024", 9 pages.

"U.S. Appl. No. 18/650,636, Notice of Allowance mailed Mar. 4, 2025", 10 pages.

"U.S. Appl. No. 18/168,852, Response filed Dec. 22, 2023 to Final Office Action mailed Sep. 22, 2023", 10 pages.

"U.S. Appl. No. 18/168,852, Notice of Allowance mailed Jan. 30, 2024", 6 pages.

* cited by examiner

STATIC ANALYSIS CORRELATION SCANNERS

CROSS REFERENCE TO RELATED APPLICATIONS

This application is a continuation-in-part of, and claims priority to, U.S. patent application Ser. No. 18/168,852, filed Feb. 14, 2023, the contents of which are incorporated herein by reference in their entirety.

TECHNICAL FIELD

Examples of the disclosure relate generally to databases and, more specifically, to security of applications executing on a data platform.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Users may develop applications that execute on data platforms. It is desirable to safeguard the security of the data platform during application deployment.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
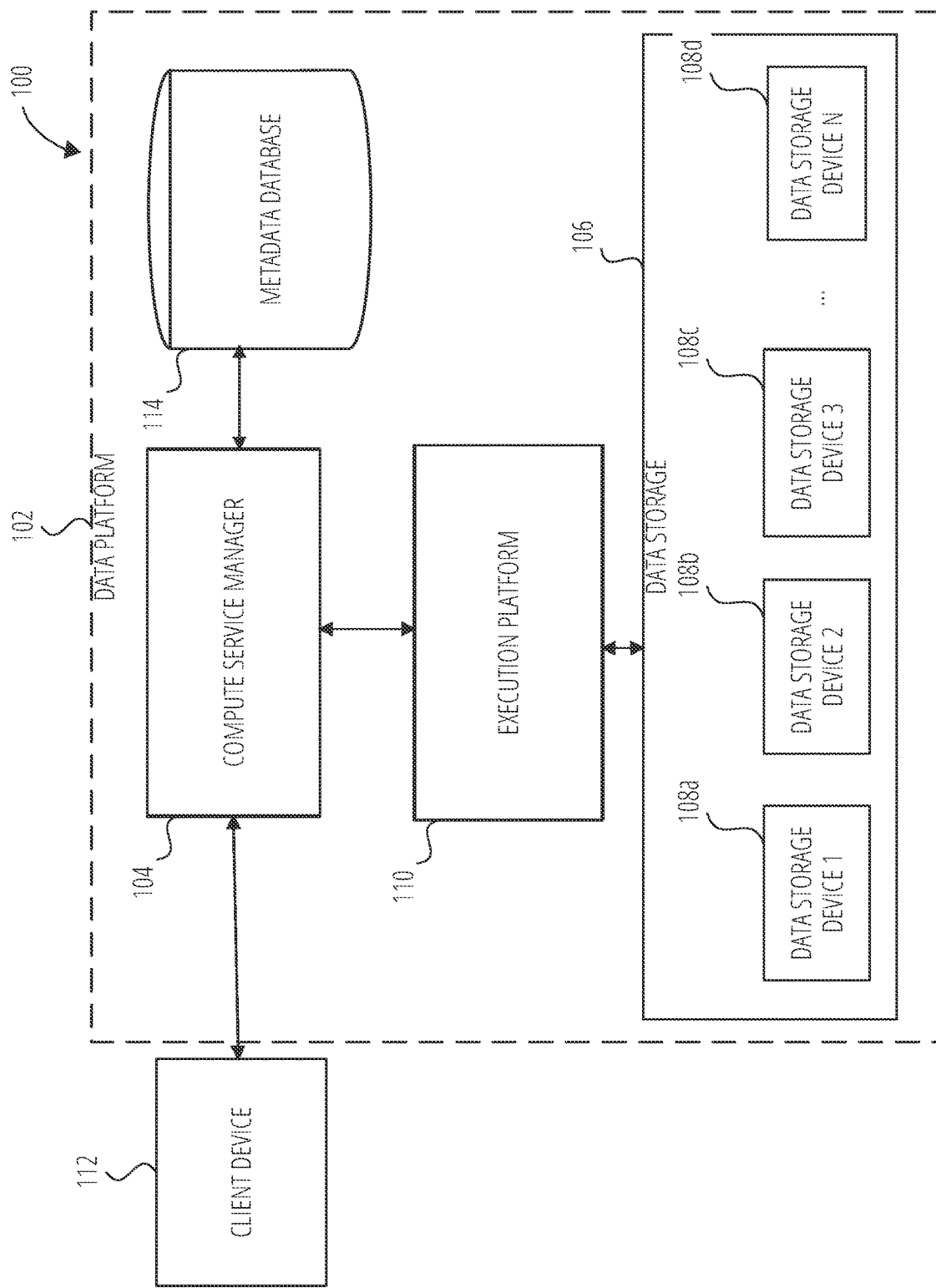
FIG. 1 illustrates an example computing environment that includes a network-based data platform in communication with a cloud storage provider system, in accordance with some examples.

An operator of a data platform may provide an application framework for users of a platform to develop their own applications that run on the data platform. Furthermore, some users may want to be content providers that provide applications and content to other users on the data platform who are consumers of the content. This enables providers to build, monetize and deploy data-intensive applications in a data platform marketplace. Such a marketplace allows consumers to discover and install applications natively within their data platform accounts. Although the application framework provides data platform providers with a platform to build their data-intensive applications, it also introduces an inherent risk of malicious actors exploiting this framework to build malicious applications that pose multiple abuse threats, including, but not limited to, data exfiltration, account compromise, intellectual property theft, and misuse of consumer's compute/storage. Even well-intended application providers can inadvertently create insecure applications that can be exploited by malicious consumers or attackers to exfiltrate provider IP and abuse the data platform and its customers. If these kinds of scenarios were to happen, it would lead to a poor experience for data platform customers with a loss of reputation for the operator of the data platform.

Various different publicly available static analysis tools may be used to perform analysis on application source code before allowing an application to be shared in a marketplace of a data platform. For each tool, combinations of publicly-available rules (e.g., an open-source vulnerability database) and custom internal rules may be used to target data platforms specifically (e.g., a rule that detects usage of a command such as 'EXECUTE AS CALLER'). However, each of these rules targets a very specific pattern in a specific language, and none of these rules on their own can very confidently indicate if an application is malicious or not, so manual review of these verdicts and the source code is performed to allow a human to decide whether to approve or reject the application package. Correlation scanners automate the work currently performed by humans by combining outputs from specific tools plus rules of interest, and creating a verdict with higher confidence based on how those outputs interact with each other. Some tools (e.g., Semgrep™) offer their own cross-language analysis, but this still only works within that tool (Semgrep™), so for example correlating a Yara™ verdict with a Semgrep™ verdict would still be impossible.

In some examples, a provider user submits a new application package to a data platform. A scan scheduler periodically polls for new application packages and detects the new application package. An anti-abuse scan service parses the installer script to determine dependencies between a primary application scan and secondary image scans. The anti-abuse scan service queues up the primary and secondary scans by writing records to status tables. A scan manager polls the tables, detects the pending scans, and invokes scanner services to run the scans. The scanner services analyze the application files and container images based on configured rules. An image service extracts and uploads the container images. The anti-abuse scan service uses a correlation scanner to join the primary and secondary results to determine an overall verdict for the application package.

In some examples, a scan manager detects a dependency relationship between primary scanners. The scan manager schedules the primary scanners to execute and generate primary scan results. The scan manager determines completion of the primary scanners. In response to determining completion, an anti-abuse scan service executes a correlation scanner to generate a correlation scan result using the primary scan results.

In some examples, the primary scanners and secondary scanners comprise different scanner types. The primary scanners comprise application scanners that scan an entire application. The secondary scanners comprise artifact scanners that scan individual files or artifacts of an application package.

In some examples, the scan manager determines a failure of at least one of the one or more primary scanners. In response to determining the failure, the scan manager prevents execution of the related secondary scans.

In some examples, scheduling the one or more primary scanners includes identifying a dependency graph indicating a dependency relationship, and scheduling execution of the one or more scanners based on the dependency graph.

In some examples, a scan manager updates a status of a dependency graph based on completion of the one or more primary scanners.

In some examples, executing the secondary scanner includes the primary scan results to identify correlations indicative of malicious content.

In some examples, a deployment decision for an application package is determined based on the identified correlations.

In some examples, the primary scan results include verdicts output by the one or more primary scanners, and wherein executing the secondary scanner includes identifying correlated verdicts and determining a confidence score based on the correlated verdicts.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
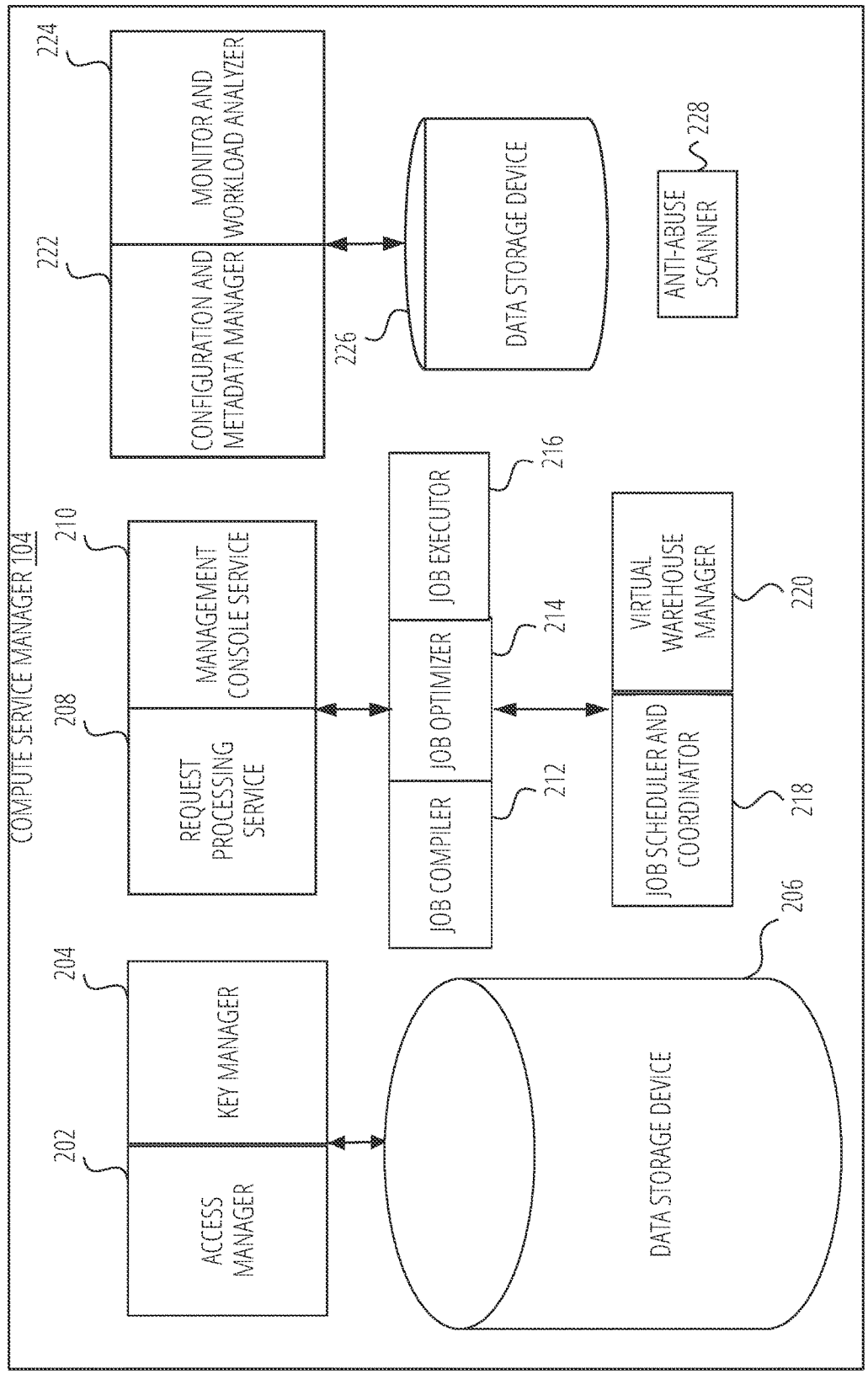
FIG. 2 is a block diagram illustrating components of a compute service manager, in accordance with some examples.

FIG. 2 is a block diagram illustrating components of the compute service manager 104, in accordance with some examples. As shown in FIG. 2, the compute service manager 104 includes an access manager 202, and a key manager 204. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

The compute service manager 104 further comprises an anti-abuse scanner 228 that monitors creation of application packages created by content providers of the data platform 102. When a new application package is created by a content provider, the anti-abuse scanner 228 scans the application package to determine if the application package contains content that is harmful, malicious, and the like. If such content is found, the anti-abuse scanner 228 prevents release of the application package by the content provider.

In some examples, the anti-abuse scanner 228 is a component of another system that the compute service manager 104 communicates with via a network of the like.

Figure 3:
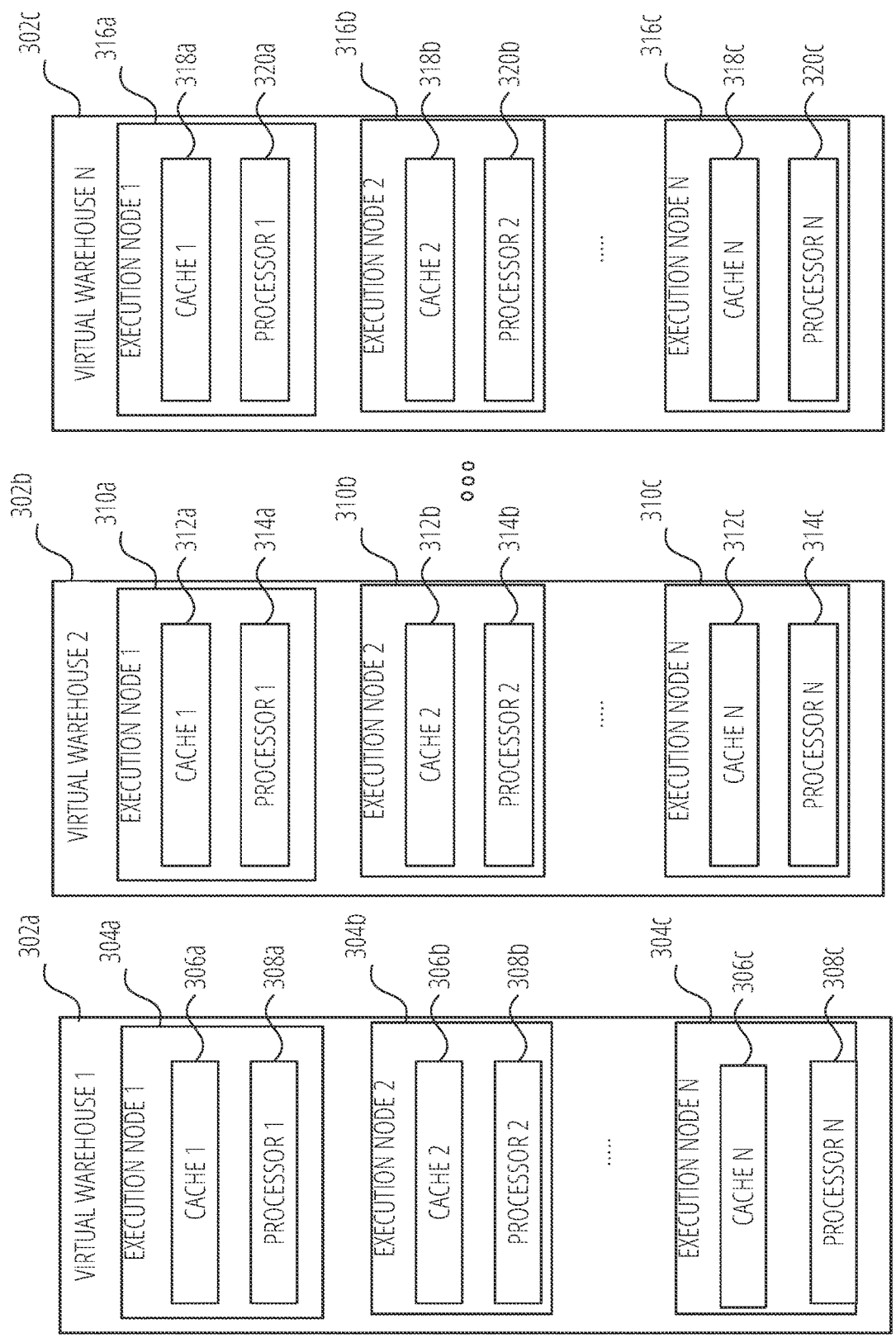
FIG. 3 is a block diagram illustrating components of an execution platform, in accordance with some examples.

FIG. 3 is a block diagram illustrating components of the execution platform 110, in accordance with some examples. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316*a*, execution node 2 316*b*, and execution node N 316*c*. Execution node 1 316*a* includes cache 1 318*a* and processor 1 320*a*. Execution node 2 316*b* includes cache 2 318*b* and processor 2 320*b*. Execution node N 316*c* includes cache N 318*c* and processor N 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302*a* implements execution node 1 304*a* and execution node 2 304*b* on one computing platform at a geographic location and implements execution node N 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
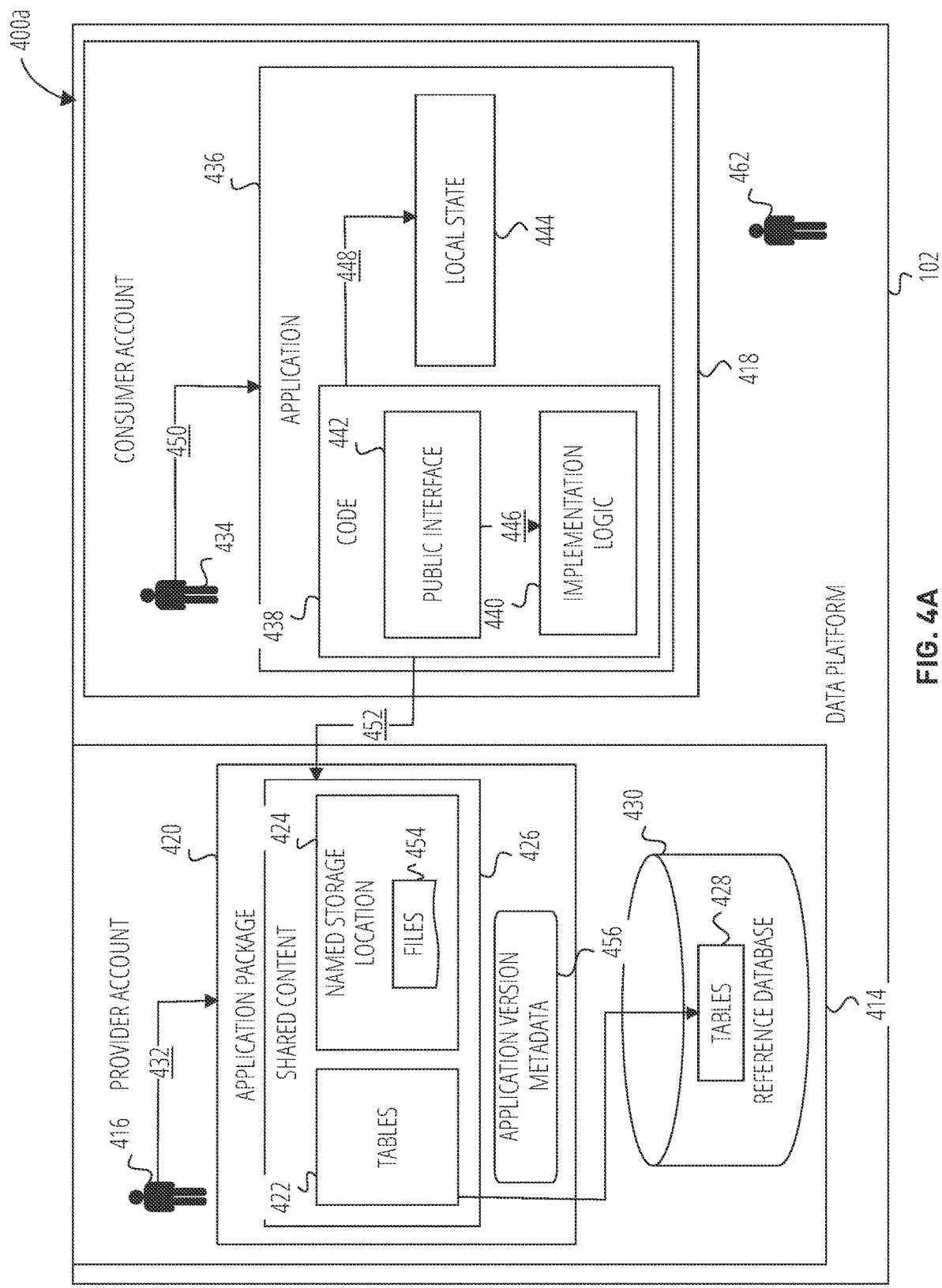
FIG. 4A is a block diagram of an application package deployment, in accordance with some examples.
Figure 4B:
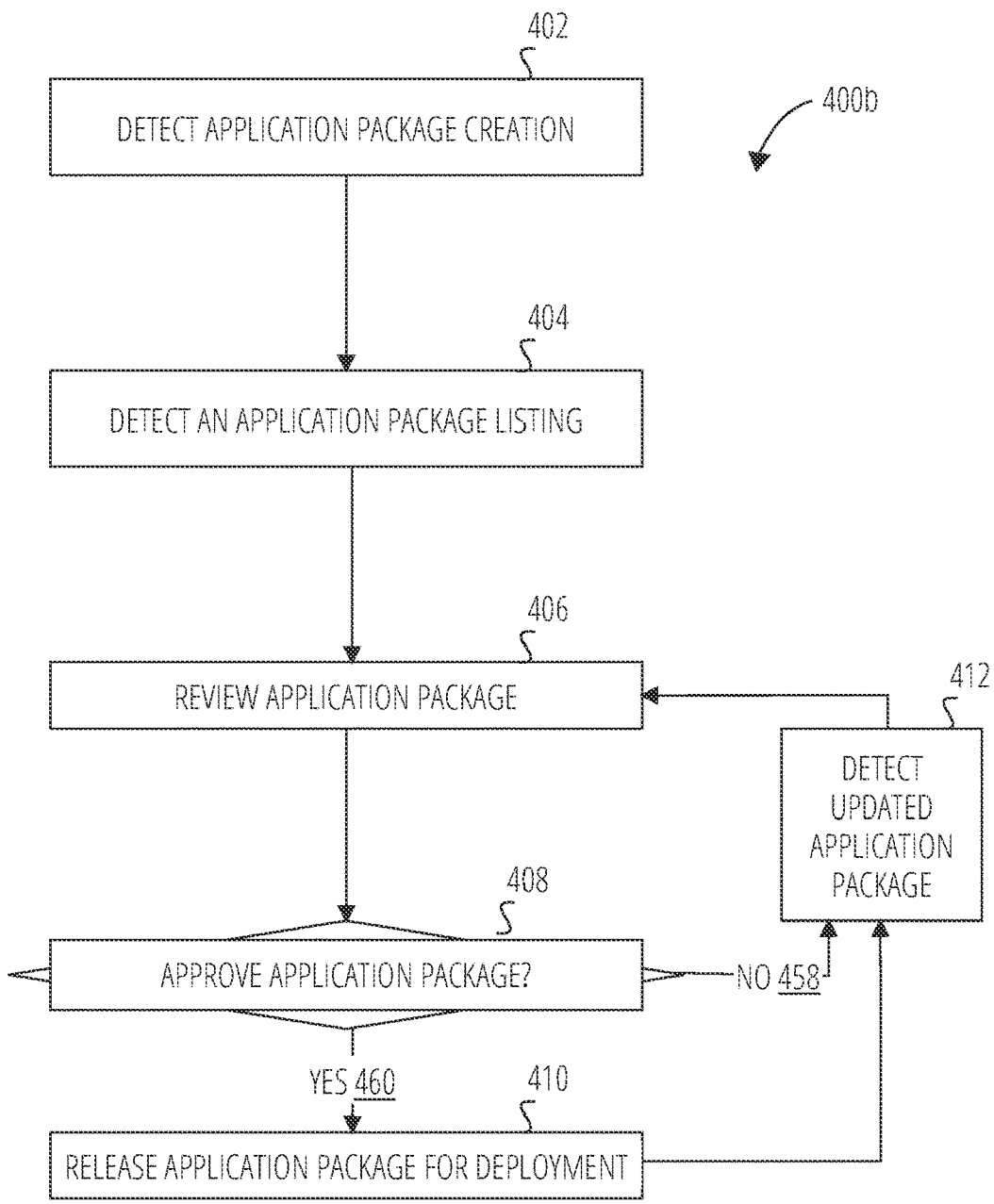
FIG. 4B is an activity diagram of an anti-abuse security scan workflow, in accordance with some examples.

FIG. 4A is a block diagram of an application package deployment 400*a* and FIG. 4B is an activity diagram of an anti-abuse security scan workflow 400*b*, in accordance with some examples. A provider 416 creates 432 an application package 420 for deployment as an application 436 to a consumer 434 on a data platform 102. Neither the provider 416 nor the consumer 434 are the operator 462 of the data platform 102. The operator 462 has a responsibility to ensure the integrity of the data platform 102 by preventing the provider 416 from deploying on to the data platform 102 content that is harmful or malicious using the application package 420. Accordingly, the operator 462 uses an anti-abuse scanner 228 (of FIG. 2) to scan the files 454 to determine whether the application package 420 contains malicious content.

The application 436 provides a useful service to the consumer 434, such as allowing the consumer 434 to access shared content 426 provided by the provider 416. The shared content is stored in a named storage location 424 maintained by the data platform 102. The shared content 426 comprises tables 422 that are extracted from tables 428 in a reference database 430 maintained by the provider 416 in a provider account 414 of the provider 416. Code 438 of the deployed application 436 uses 452 the shared content 426 from a consumer account 418 when the consumer 434 accesses 450 the deployed application 436. Code 438 comprises a public interface 442 that uses 446 implementation logic 440 to provide a user interface to the consumer 434. The application 436 further comprises a local state 444 that the code uses and updates 448. The local state comprises the state of the deployed application 436 such as a configuration and local data storage of the deployed application 436 within the security context of the consumer account 418.

The application package includes an application version metadata 456 that is not visible to the provider 416. The application version metadata 456 comprises metadata of the application package 420 that the data platform 102 accesses during an anti-abuse scanning process as more fully described in reference to FIG. 5A, FIG. 5B, and FIG. 5C.

In operation 402, the data platform 102 detects that the provider 416 is creating the application package 420. In response to detecting the creation of the application package 420, the data platform 102 generates application version metadata 456 comprising a hidden version validation attribute or property with a value set to a disabled state and sets a creation property to a new state. This prevents the release of the application package 420 by the provider 416 into an application marketplace of the data platform 102. In some examples, the data platform 102 detects that the provider creates versions of the application package 420. In response, the data platform 102 does not trigger an automated anti-abuse scan but adds metadata to the application version metadata 456 describing the version of the package, sets a scan property status to a new state indicating no anti-abuse reviews or scans have been performed on the application package 420.

In operation 404, the data platform 102 detects that the provider 416 creates a marketplace or public listing for the application package 420. In some examples, the data platform 102 detects that the provider 416 alters a private listing to add external targets and the application package will not be listed in the public marketplace. In response to detecting a listing, the data platform 102 sets a property of the listing to a drafted and unpublished state, so changes are not effective until the listing is reviewed, approved and published by the data platform 102. In some examples, the data platform 102 updates the application version metadata 456 to set the version validation property to an enabled state.

Figure 5A:
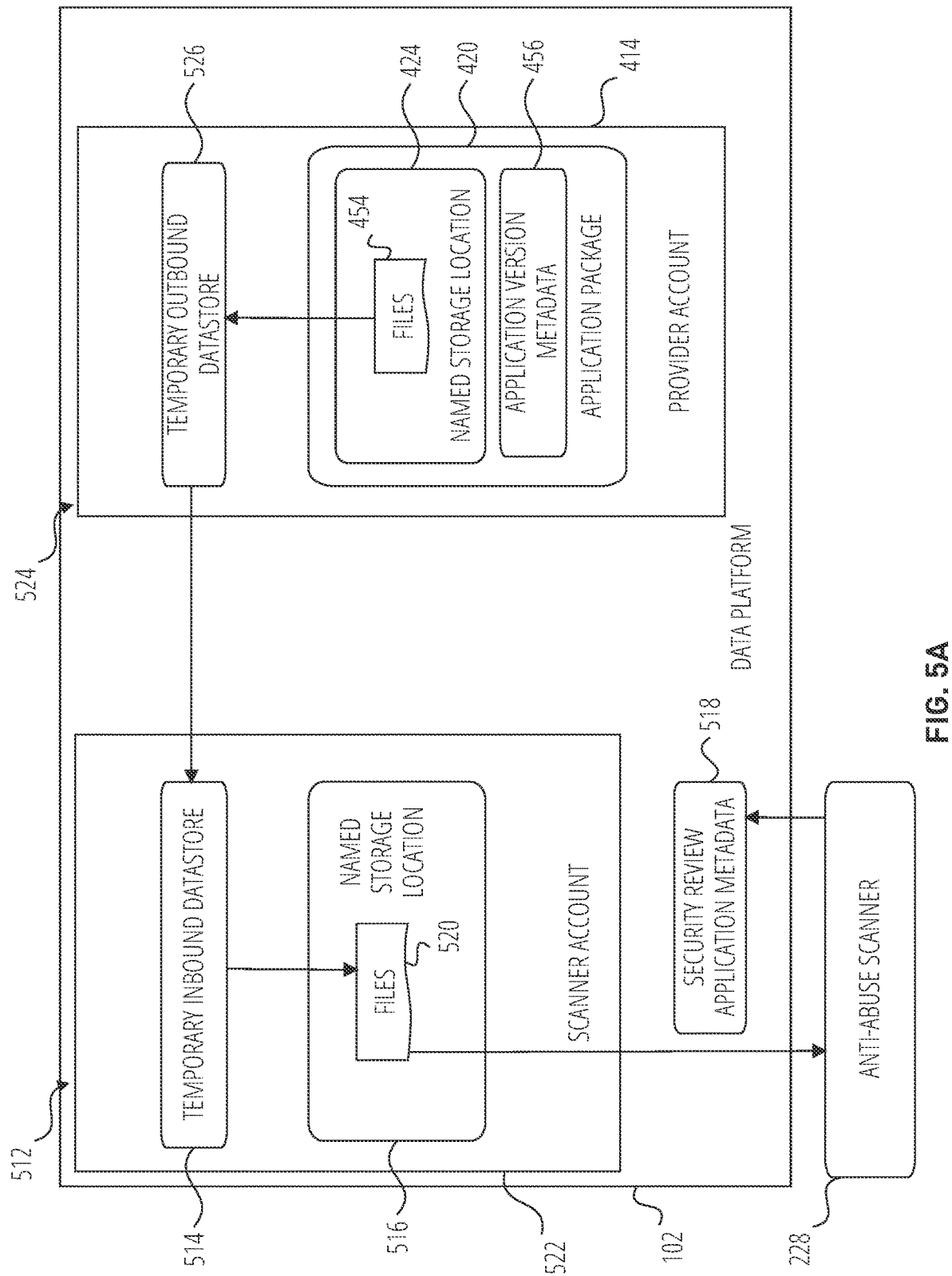
FIG. 5A is a data flow diagram of an anti-abuse scanning method, in accordance with some examples.
Figure 5B:
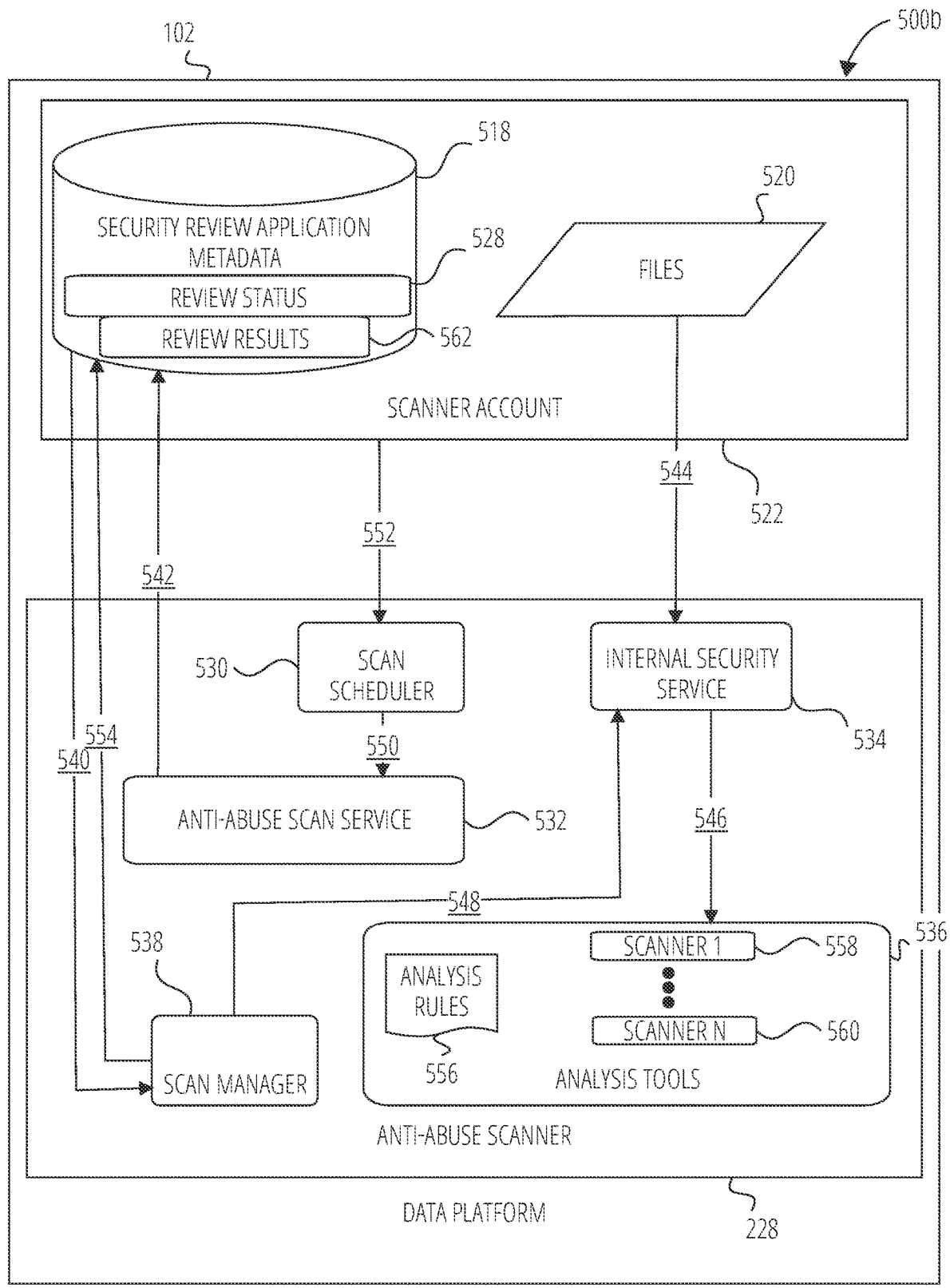
FIG. 5B is a collaboration diagram of an anti-abuse scanning pipeline, in accordance with some examples.
Figure 5C:
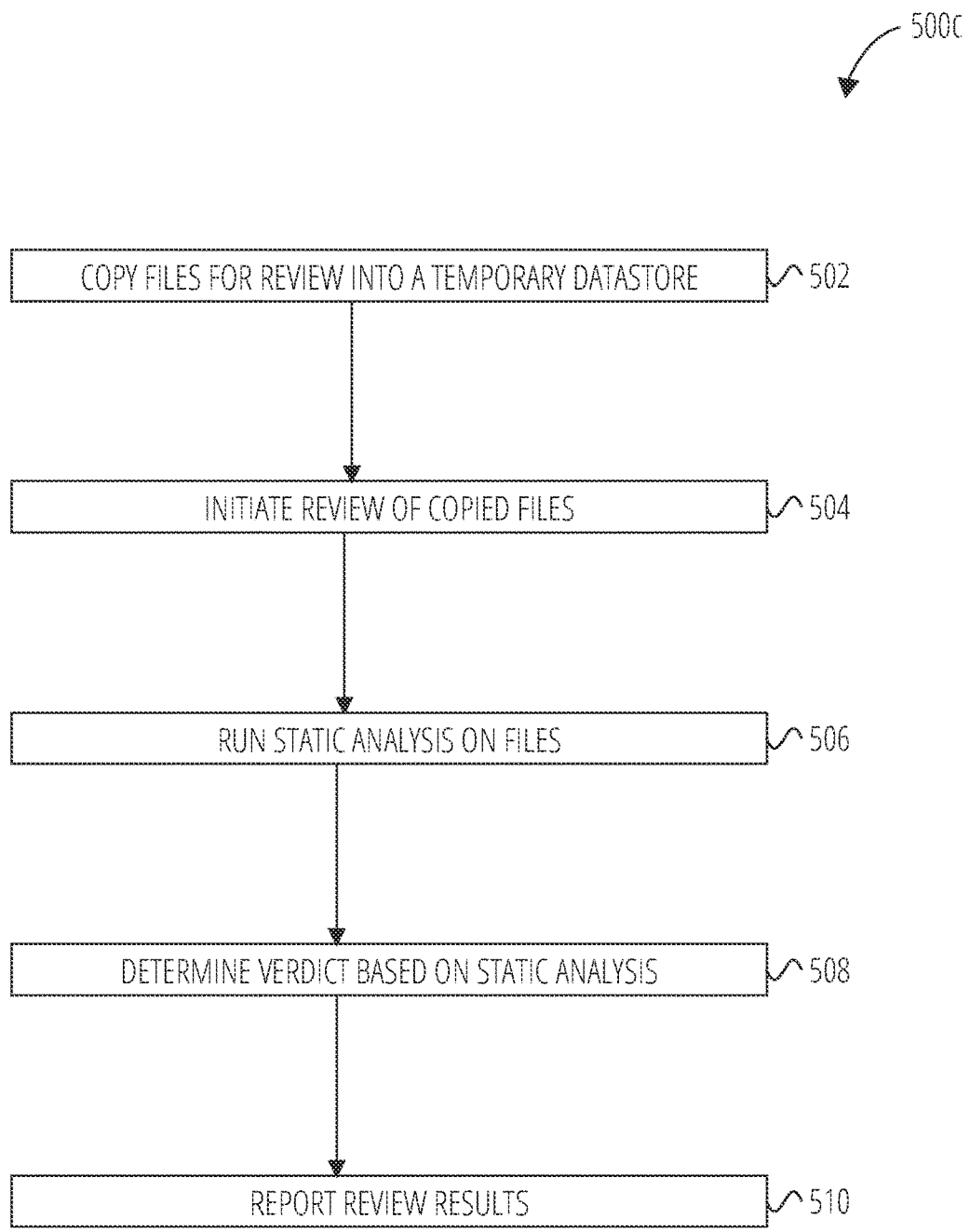
FIG. 5C is an activity diagram of an anti-abuse scanning method, in accordance with some examples.

In operation 406, the data platform 102 pushes all versions and patches of the application package 420 for automated review by a scanning workflow as more fully described in reference to FIG. 5A, FIG. 5B, and FIG. 5C.

In operation 408, the data platform 102 determines if the application package 420 has been approved. For example, the data platform 102 determines that scanning of the application package 420 and its versions and patches is complete and the data platform 102 writes a verdict and status to the application version metadata 456 for each version and patch of the application package 420. A listing is published or released if the functional and profile review has been performed, and only approved versions remain in the application package 420.

In operation 410, in response to determining that the application package 420 is approved 460, in operation 410, the data platform 102 releases the application package 420 for deployment by the provider 416 so that a consumer 434 can deploy the application 436 in their own consumer account 418 and uses the application 436 to access the shared content 426 provided by the provider 416.

In some examples, in a case the data platform 102 does not approve 458 the application package 420, the provider removes any unapproved versions or patches from the application package 420 by adding new approved versions or updates of the application package 420, updates release directives, waits for an upgrade to occur, and removes the non-approved versions or patches. In operation 412, the data platform 102 detects the updated application package 420 and, in operation 406, reviews the application package 420.

In some examples, the data platform 102 continuously polls for updates to the application package 420. When a provider subsequently creates new versions in the application package 420, in operation 412 the data platform 102 detects that the update has occurred. In response to detecting that an update to the application package 420 has occurred, in operation 406, the data platform 102 triggers an automated review of the application package 420 as described herein. In some examples, an automated review is triggered for the versions being added, with those versions being set in a pending state (as opposed to an added state). If the automated review is successful and the new versions or updates to the application package 420 are approved, the versions are added and available in the package to be referenced by directives, otherwise they are marked as deleted in the application version metadata 456.

FIG. 5A is a data flow diagram of an anti-abuse scanning method, FIG. 5B is a collaboration diagram of an anti-abuse scanning pipeline 500b, and FIG. 5C is an activity diagram of an anti-abuse scanning method 500c, in accordance with some examples. A data platform 102 uses the anti-abuse scanning pipeline 500b to scan files of an application package 420 for content that may be harmful or malicious before that content is released on a data platform 102 to consumers of the content of the application package 420.

In operation 502, the data platform 102 copies the files 454 of the application package 420 to a set of temporary files 520 in a named storage location 516 of a scanner account 522. For example, the data platform 102 creates a temporary inbound datastore 514 in the scanner account 522 of a scanner deployment 512 and a corresponding temporary outbound datastore 526 in the provider account 414 of a provider deployment 524. In some examples, the data platform 102 uses these temporary datastores to decrypt and encrypt large files during a copy process. In some examples, the data platform 102 copies the files 454 of the application package 420 into the temporary outbound datastore 526 using a copy service. In some examples, the data platform 102 sets a property in the security review application metadata 518 to a pending copy state.

In some examples, the data platform 102 sends a review request with details of the application package review and the location of application files 454 to the scanner deployment 512 by looking up the review object using the copy service client id of a copy service. In some examples, a global messaging system is used so as to avoid the provider account 414 resolving to the named datastore of the scanner account 522. In some examples, the global message framework runs in privileged mode thus double copy is worth keeping the logic unified. In some examples, the data platform 102 updates the security review application metadata 518 and sets a status property to a "new" state. In some examples, the data platform 102 sets a status property in the security review application metadata 518 to a pending scan state.

In some examples, the anti-abuse scanner 228 issues a system command to list reviews by status state, such as the pending scan state.

In operation 504, a scan scheduler 530 of anti-abuse scanner 228 scans the security review application metadata 518 for a review status datastore 528 in a state of a pending scan review and initiates a scan of the files 520 based on the state of the review status datastore 528. For example, the anti-abuse scanner 228 is associated with the application package 420 account in a corresponding deployment and is authorized to fetch pending reviews from the review status datastore 528 of the security review application metadata 518 and write review results 562 to the security review application metadata 518. To do so, the anti-abuse scanner 228 periodically polls for new application packages, such as application package 420, available for review. In some examples, the scan scheduler 530 schedules re-scans of existing application packages. In some examples, the scan scheduler 530 periodically polls for new scans to run. In some examples, the scan scheduler 530 periodically fetches 552 from the scanner account 522 pending review requests. In some examples, the scan scheduler 530 also fetches 552 previous successful and unsuccessful scans that haven't been run in a specified amount of elapsed time.

In operation 506, if there are application packages, such as application package 420, available for review, then the anti-abuse scanner 228 runs a static analysis on the files. For example, the scan scheduler 530 calls 550 an anti-abuse scan service 532 for each application package to scan. The anti-abuse scan service 532 determines the scans to run for the application package, and writes 542 a status set to pending for each application package being scanned to the review status datastore 528 datastore.

A scan manager 538 runs in a background process of the data platform 102 and polls 540 for pending application package scans, and detects the new scans to run. In response to detecting a new scan, the scan manager 538 calls 548 internal security service 534 to run the scans for a given application package. In some examples, the scan manager 538 retries previously failed scans for a specified number of retries.

The internal security service 534 downloads 544 the artifacts or files 520 of the application package 420 stored in the scanner account 522.

The internal security service 534 invokes 546 local analysis tools 536 to scan the downloaded files 520.

In operation 508, when the analysis tools 536 complete their analysis of the files 520, the scan manager 538 determines a verdict of whether the files 520 contain content that is harmful or malicious and updates 554 the results to the security review application metadata 518 in the scanner account 522, and triggers a deployment decision in a form of an automatic approval, an automatic rejection, or a manual review of the application package 420. In some examples, the anti-abuse scanner 228 compares current review results of a scan of an application package to previous review results from a previous review of the application package and triggers an automatic approval, an automatic rejection, or a manual review based on the comparison. For example, if the application package 420 review results have changed as compared to a previous scan to an extent that the package is now automatically rejected, the anti-abuse scanner 228 determines to submit the application package for manual review rather than issuing an automatic rejection.

In some examples, the analysis tools 536 comprise a set of scanner tools, as illustrated by scanner 1 558 to scanner N 560, that implement respective static analysis scanning methodologies for detecting content that is harmful or malicious. The scanner tools include, but are not limited to, Semgrep™, SpotBugs™/FindSecBugs™, Open Web Application Security Project® (OWASP) Dependency Check™, ClamAV™, and Yara™. Indicators of malicious functionality in the source code are caught using a set of analysis rules 556.

In some examples, based on the programming languages employed by the provider to create the files 520 and the analysis rules 556, the anti-abuse scanner 228 determines a subset of scanner tools of the set of scanner tools to generate a verdict regarding an artifact or file. Each scanner tool of the subset of scanner tools generates a respective verdict of a set of verdicts where each verdict is a verdict by a scanner tool of whether the files 520 contain content that is harmful or malicious. In some examples, each scanner tool generates a verdict that includes a confidence score. In some examples, a scanner tool outputs a scanner-specific output with additional details about what the scanner tool detected in the files 520. The anti-abuse scanner 228 determines a set of verdicts based on the set of scanners and aggregates the set of verdicts to determine a deployment decision of whether to approve the application package for deployment on the data platform 102, reject the application package for deployment on the data platform 102, or require a manual review of the application package before the application package can be deployed on the data platform 102.

In some examples, the anti-abuse scanner 228 determines a risk score for an application package based on the set of verdicts and compares the risk score to a set of threshold risk score values. The anti-abuse scanner 228 automatically approves an application package based on the risk score of the application package failing to exceed a minimum (first) specified threshold risk score value. The anti-abuse scanner 228 automatically rejects an application package based on the risk score of the application package exceeding a maximum (second) specified threshold risk score value. The anti-abuse scanner 228 triggers a manual review, requiring a human reviewer to take a look at the scanner output to then approve or reject an application package, based on the risk score of the application package exceeding the minimum (first) specified threshold risk score value and failing to exceed the maximum (second) specified threshold risk score value.

In some examples, the anti-abuse scanner 228 determines a confidence score for a rejection verdict, where the confidence score falls within a range of confidence scores such as, but not limited to, from 0-10, with 10 being the most confident. Additionally, the anti-abuse scanner 228 analyzes any verdicts from previous scans that have been manually approved or rejected. The anti-abuse scanner 228 determines a deployment decision based on a set of threshold confidence value scores and verdicts from previous scans of the application package. For example, if all verdicts either have a confidence less than a first threshold confidence score value (e.g., 3), or have been manually approved and haven't changed since the manual approval, the anti-abuse scanner 228 determines to automatically approve the application package 420 for deployment on the data platform 102. If any rejection verdict has a confidence score exceeding a second confidence score value (e.g., 7) and has not been manually approved, or if any rejection verdict has previously been manually rejected and has not changed since manual rejection, then the anti-abuse scanner 228 determines to automatically reject the application package for deployment on the data platform 102. In all other cases, the anti-abuse scanner 228 triggers a manual review.

In some examples, the anti-abuse scanner 228 updates 554 a review status datastore 528 state, and review results 562 including examples of scan results to the security review application metadata 518 and stored in tables in the security review application metadata 518. In some examples, a table stores an overall status of the entire application package scan and deployment decision (approved, rejected, manual review), while another table stores detailed output logs for each scan run over the artifacts or files of the application package.

In some examples, the anti-abuse scanner 228 triggers a manual review by communicating an alert to scanner account 522. A service of the scanner account 522 periodically checks for a review status datastore 528 having a state of manual review required and communicates an email to a security engineer of the data platform 102 to perform a manual review in order to make a deployment decision. When the manual review is triggered, the reviewer will review the review status datastore 528 and the review results 562 and manually approve or reject the application package. If the reviewer decides to approve the application package, an approval procedure executes a system command to approve the security review for the application package, and update each flagged verdict in the review status datastore 528 as manually approved. If the reviewer instead decides to reject the application, a rejection procedure executes a system command to reject the security review for the application package, and take a list of verdicts that represent the reason for rejection to mark each of them as manually rejected in the review status datastore 528.

In some examples, in subsequent background scans or scans of future versions of an application package that was not approved, the anti-abuse scanner 228 will take manual approvals and manual rejections into account to avoid re-triggering manual review for an identical verdict.

In some examples, if the scanner output logs of the review results 562 do not have enough detail for a reviewer to make a decision, they reviewer may need to inspect the application code. To support this scenario, the data platform 102 will host a secure datastore serving as a container with permissions to download and view files of the application package, along with an Integrated Development Environment (IDE) to visualize them. In some examples, access to this container is limited to security engineers on the security team, and both logins to the container and file downloads are audited In some examples, files of an application package under review will not leave the secure datastore.

In some examples, the anti-abuse scanner 228 performs periodic scans including, but not limited to, handling new review requests, periodic re-scans, and retrying failures. The periodic scans are based on a variety of criteria including, but not limited to, reviewing requests for new applications, re-running scans that have permanently failed by exceeding a maximum number of retries, and re-scanning versions of application packages of active versions that have succeeded.

In some examples, re-scans are performed on active versions of an application package to catch new vulnerabilities in case the operator 462 of the data platform 102 retroactively adds new analysis rules 556.

In some examples, on a re-scan of an active application package, a status change to an already-published version (e.g., a newly-triggered manual review, or a new automatic rejection) triggers trigger a manual review, and the action taken will happen manually on a case-by-case basis.

In operation 510, the scan manager 538 updates 554 the review results 562 of the security review application metadata 518 with a generated verdict. The anti-abuse scanner 228 communicates the verdict to the provider deployment 524 with a global message to update the corresponding application version metadata 456. The anti-abuse scanner 228 also writes this verdict as review status datastore 528 in the security review application metadata 518 in the scanner account 522 along with any other logs and metrics related to the scan as review results 562.

Figure 6A:
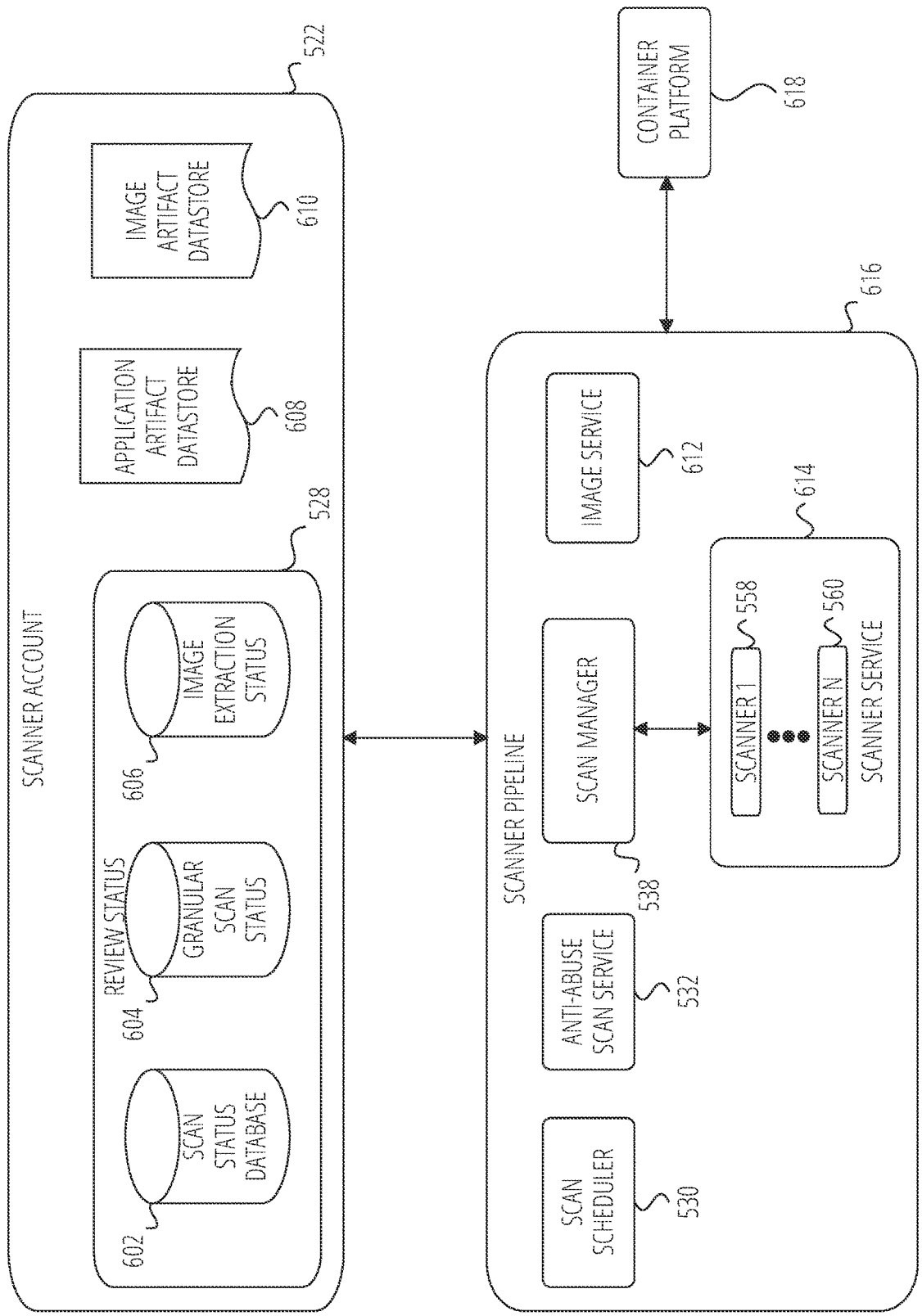
FIG. 6A is a collaboration diagram of an anti-abuse scanning pipeline using correlated scanners, in accordance with some examples.
Figure 6B:
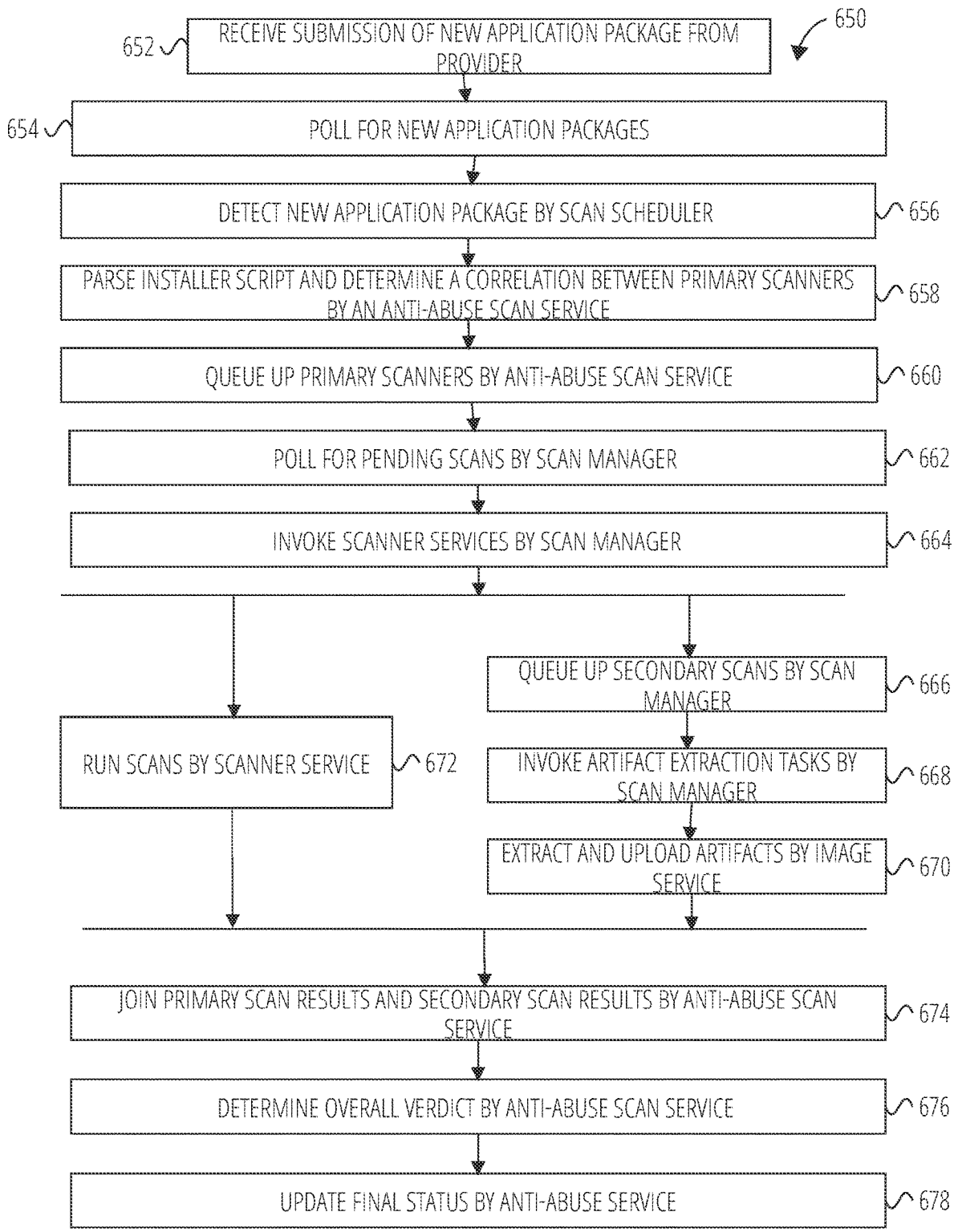
FIG. 6B is an activity diagram of a correlation scanner method using correlated scanners, in accordance with some examples.

FIG. 6A is a collaboration diagram of an anti-abuse scanning pipeline using correlated scanners and FIG. 6B is an activity diagram of a correlation scanner method 650 using correlated scanners, in accordance with some examples. Although the correlation scanner method 650 depicts a particular sequence of operations, the sequence may be altered without departing from the scope of the present disclosure. For example, some of the operations depicted may be performed in parallel or in a different sequence that does not materially affect the function of the routine. In other examples, different components of a data platform or system that implements the correlation scanner method 650 may perform functions at substantially the same time or in a specific sequence.

In operation 652, a provider 416 (of FIG. 4A) submits a new native application package 420 (of FIG. 4A) for deployment to the data platform 102 (of FIG. 1). For example, the provider 416 using an application development framework creates a new native application package containing the files and components for the application. This may include source code files, compiled binaries, container images, an installer script, and metadata like the application name and version.

Once the provider 416 has finished developing and testing their application package, they submit the finalized application package through a user interface for publishing application packages. This interface allows them to upload the package files and specify metadata like the application name, description, required permissions, and licensing information. By submitting the package through this interface, the developer triggers an automated anti-abuse scanning workflow using a scanner pipeline 616. The application package will be picked up by the scan scheduler 530 and passed to other components of the scanner pipeline 616 for validation before it can be deployed to consumers in the data platform marketplace.

The submission of the provider 416 includes all the necessary components for deployment, but remains in a pending unreleased state until approved by the automated scanning process. Once approved and released, consumers will be able to discover the application and install it in their own data platform accounts.

In operation 654, the scan scheduler 530 runs on a periodic schedule and polls for any new application packages submitted by providers. For example, the scan scheduler 530 is configured to run periodically as a scheduled job within the infrastructure of the data platform 102. On each run, the scan scheduler 530 queries one or more database tables that track application package submissions to check if any new packages have been submitted since its last run.

In some examples, the scan scheduler 530 queries a scan status database 602 of a review status datastore 528 to look for entries with a status of 'PENDING' and no scan ID, indicating that a scan has not yet been started for that application package. In some examples, the scan scheduler 530 queries a separate submissions table that tracks new package uploads before they are written to the scan status database 602.

If any new pending application packages are found, the scan scheduler 530 initiates the scanning workflow by calling the anti-abuse scan service 532 and passing it the necessary details like the application name, version, storage location of the package files, and the like. If no new submissions are found, the scan scheduler 530 simply finishes its run and waits until the next scheduled invocation to poll again.

This allows the scanner pipeline 616 to quickly pick up and begin scanning any developer-submitted packages within an interval between scan scheduler 530 runs. The frequent polling ensures new application packages do not sit too long before being picked up and scanned.

In operation 656, the scan scheduler 530 detects that a new native application package has been submitted by a provider. For example, when the scan scheduler 530 queries the scan status database 602 for new application package submissions, the scan scheduler 530 detects that a record exists for a package called 'MyApp v1.0' submitted by a provider user 'john provider'. The record indicates this is a new submission that has not yet been scanned, with a status of 'PENDING' and no scan ID assigned. The scan scheduler 530 extracts the necessary details from this record such as the application name, version, storage location of the package files in a container platform 618, and the like.

When the scan scheduler 530 detects this new pending application package submission, the scan scheduler 530 initiates the scanning workflow by calling the anti-abuse scan service 532 and passing the anti-abuse scan service 532 these extracted details including the application name, version, storage location, submitting user ID, and any other relevant metadata obtained from the submission record. The anti-abuse scan service 532 receives the extracted details and begins the process of parsing, scanning and validating the application package stored in an application artifact datastore 608 of a scanner account 522 based on the details provided by the scan scheduler 530.

In operation 658, the anti-abuse scan service 532 parses the installer script of the submitted application package to enumerate all the application files and container images included in the package. For example, once the anti-abuse scan service 532 receives the pending application package details from the scan scheduler 530, the anti-abuse scan service 532 downloads the installer script included in the package submission. The anti-abuse scan service 532 then parses through this installer script to extract a list of all components that make up the application package. This component list enumerates details like the names and locations of all source code files, compiled binary files, container images, dependencies, and other artifacts that are part of the package.

By parsing this installer script, the anti-abuse scan service 532 identifies everything that needs to be scanned for that application package submission. This allows the anti-abuse scan service 532 to then queue up the required scans by writing records to the scan status database 602, granular scan status database 604, and the image extraction status database 606 indicating which components need to be scanned. For example, the anti-abuse scan service 532 can queue up a primary scan on the source code files of the application, and secondary scans on each file or container image. The parsing of the installer script allows the anti-abuse scan service 532 to automatically enumerate and prepare all the components that require scanning for a given application package submission.

In some examples, the scan manager 538 detects a dependency relationship between primary scanners. The scan manager 538 schedules the primary scanners to execute and generate primary scan results and determines completion of the primary scanners. In response to determining completion, the scan manager 538 executes one or more correlation scanners that use the primary scan results to generate a correlation scan result.

In some examples, a scanner interface is used that specifies which other scanner rules a scanner depends on.

In some examples, scanner specific logic is used to calculate which of one or more correlation scanners should be run based on the types of primary scanners that are run.

In some examples, dependency tracking is used when scheduling scans to ensure that a correlation scanner is only run after all of the primary scanners upon which the correlation scanner depends are run and have completed successfully.

In some examples, each scanner is represented by a typed interface. An artifact scanner interface applies to a file, and an application scanner interface applies to the whole application. A correlation scanner interface includes extra logic to specify which other types of scans it depends on.

In some examples, the primary scanners and secondary scanners comprise different scanner types. The primary scanners comprise application scanners that scan an entire application. The secondary scanners comprise artifact scanners that scan individual files, artifacts, or images of an application package.

In some examples, the scan manager 538 detects a dependency relationship between a correlation scanner and one or more primary scanners. The scan manager 538 schedules the primary scanners to execute and generate primary scan results. The scan manager 538 determines completion of the primary scanners. In response to determining completion, the scan manager 538 executes one or more correlation scanners using the primary scan results to generate a correlation scan result.

In operation 660, the anti-abuse scan service 532 queues up a primary application scan by writing a pending record to the scan status database 602. For example, after parsing the installer script and enumerating the components needing scanning, the anti-abuse scan service 532 writes a record to the scan status database 602 to queue up the primary scan. This record includes details like the application name, version, storage location of the source code files, submitting user ID, and initial status set to 'PENDING'.

By writing this record to the status table, the anti-abuse scan service 532 triggers the primary scan workflow for scanning the application package source code and binaries. The scan manager 538 periodically queries this table and will detect the new pending record. Seeing this, the scan manager 538 then knows it needs to invoke the scanning pipeline by calling the scanner service 614 and passing the application details.

In operation 662, the scan scheduler 530 polls for any pending scans in the status tables. For example, the scan manager 538 is implemented as a continuously running service that periodically queries the status tables, such as scan status database 602, to check for any pending scans. This polling happens on a defined schedule.

When the scan manager 538 queries the status tables, it checks for any records with a status of 'PENDING', indicating that a scan needs to be performed In this case, the scan manager 538 detects the records written by the anti-abuse scan service 532 for the new application package submission with status PENDING.

Detecting this pending record triggers the scan manager 538 to initiate the scanning workflow for this application package. It does this by calling the scanner service 614 and passing the details from the pending record like application name, version, storage location, and the like.

In some examples, scheduling the one or more primary scanners includes identifying a dependency graph indicating a dependency relationship, and scheduling execution of the one or more scanners based on the dependency graph.

In operation 664, the scan manager 538 invokes the appropriate scanner services, such as scanner 1 558 to scanner N 560, by calling scanner service 614 to run scans on the application package files. For example, after the scan manager 538 detects the pending record for the new application package submission, the scan manager 538 invokes the scanning process on the application files. To do so, the scan manager 538 calls the scanner service 614, which is responsible for coordinating the different scanning tools and rules. The scan manager 538 passes parameters like the application name, version, storage location of the source code files, and other relevant details, of the application package to be scanned.

The scanner service 614 then retrieves the application files from container platform 618 using the specified location. The scanner service 614 iterates through the configured scanning tools like Semgrep™, SpotBugs™, OWASP Dependency Check™, and the like, and invokes each scanner, passing the application files as input.

The scanners analyze the source code based on their rules, and output any findings indicating potential vulnerabilities, malware, abuse risks, and the like.

In operation 666, the scan manager 538 also queues up any required secondary scans by writing pending records to the granular scan status database 604. For example, in addition to the main application files, the installer script may also specify artifacts such as, but not limited to, files, image containers, and the like, that are part of the application package. These objects are scanned for vulnerabilities as well. Similarly to how the scan manager 538 queues up the primary scan on the application source code, the scan manager 538 also writes records to the image extraction status database 606 table for each artifact referenced in the installer script. In some examples, these records include details like the artifact name, version, registry location, and an initial status of PENDING. Writing these records queues up secondary scan jobs to first extract each artifact, and then scan the contents using tools like ClamAV, Trivy, and the like. In some examples, the scan manager 538 polls the image extraction status database 606 too and invokes the scanner service 614 to handle the extraction and scanning of these queued artifacts.

In operation 668, the scan manager 538 dispatches the queued artifact extraction tasks by invoking the scanner service 614. For example, when the scan manager 538 detects pending image extraction jobs in the image extraction status database 606 table, the scan manager 538 needs to dispatch those jobs to be run. The scan manager 538 does this by calling the image service 612 and passing the details from the pending records, like image name, version, registry location, and the like. The image service 612 then uses this information to pull the specified artifacts from the provider's registry using pre-fetched credentials. The image service 612 extracts the artifact contents and uploads the files to a storage location like the image artifact datastore 610. Once extraction is complete, the image service 612 updates the record status to COMPLETE in the image extraction status database 606. The scan manager 538 detects the artifacts are extracted and available for scanning and schedules the artifact scans by again calling the scanner service 614 and passing the artifact details.

In operation 670, the image service 612 extracts the artifacts and uploads the extracted artifacts. For example, once the image service 612 receives the call from the scan manager 538 to extract a queued container image, the image service 612 handles the process of pulling down the artifacts and extracting their contents. In some examples, the image service 612 uses the artifact name, version, and registry details passed by the scan manager 538 to authenticate and pull down the artifact from the provider's container registry in the container platform 618. The image service 612 extracts the layered artifact contents and metadata using container image tools like Dive™ or Skopeo™. The extracted artifact files are then uploaded to a storage location accessible to the scanning pipeline, such as the image artifact datastore 610. Uploading the artifacts stages them to be scanned. The image service 612 updates the status to COMPLETE in the image artifact datastore 610 once extraction and uploading is done.

In some examples, executing the secondary scanner includes the primary scan results to identify correlations indicative of malicious content.

In operation 672, the scan manager 538 runs scans on the application package files using the configured static analysis scanners and rules. For example, once the application files are staged and the scanner service 614 is invoked by the scan manager 538, the actual scanning process begins. The scanner service 614 iterates through each of the configured static analysis scanners like Semgrep™ SpotBugs™, OWASP Dependency Check™, and the like. For each scanner, the scanner service 614 calls the appropriate scanner, passing the location of the application files to be scanned as input parameters.

In some examples, the anti-abuse scan service 532 executes primary scans in accordance with a dependency graph to ensure proper ordering and completion of related scans. After detecting pending scans in the status tables, the anti-abuse scan service 532 uses the dependency graph describing the dependencies between the scans that are mapped to a directed acyclic graph data structure. In this dependency graph, each primary scan is represented as a node, and directed edges connect certain nodes together to indicate dependencies. For example, a correlation scan node will have incoming edges from the nodes of primary scans that it depends on.

Using this dependency graph, the anti-abuse scan service 532 determines an order of operations to execute the primary scans. It processes the graph to schedule dependent scans after their prerequisites are completed. The anti-abuse scan service 532 traverses the graph, queues the primary scans without dependencies first, then iteratively queues dependent scans as their prerequisites finish. After queuing a scan, the anti-abuse scan service 532 invokes the scanner service to execute it. Once a queued scan completes, the anti-abuse scan service 532 marks its node as completed. This ripples through the dependency graph and triggers queuing of other scans that depend on it. By dynamically processing the dependency graph as scans finish, the anti-abuse scan service 532 coordinates executing interrelated primary scans in a proper order that satisfies their dependencies. In some examples, the secondary scans are incorporated into the dependency graph based on their relationship to one or more primary scans.

In some examples, the scanner service 614 has each scanner tool integrated and handles invoking them. The scanner service 614 mounts or downloads the application files, and runs the scanner executable or API on those files. The scanners analyze the artifacts of the application program according to their rules, and output findings like vulnerabilities, hardcoded secrets, abuse risks, and the like. The scanner service 614 collects these raw scan results, processes them into a standardized format, and returns them to the scan manager 538. The scan manager 538 receives the scan results and stores them in the granular scan status database 604.

In some examples, the scan manager 538 determines a failure of at least one of the one or more primary scanners. In response to determining the failure, the scan manager 538 prevents execution of the related secondary scans.

In some examples, the outputs of all the scanners are normalized into a consistent format, allowing simplified internal correlation with custom extensions of the correlation scanner interface defining how to correlate them. Example correlations include using all detected verdicts of the types specified in a set of rules, structured information about an applications manifest (such as privileges the application requests), information about the application structure (such as the list of stored procedures used in the application, with a mapping of stored procedure name→scanned file name), and the like.

In operation 674, the anti-abuse scan service 532 joins the primary and secondary scan results to determine overall outcomes. For example, once the primary application file scans and secondary container image scans have completed, the anti-abuse scan service 532 aggregates the results to determine an overall verdict. The primary scans on the application source code produce a set of findings, verdicts, and risk scores. The secondary scans on the extracted container images do the same. The anti-abuse scan service 532 takes these two sets of scan results and joins them together into a single aggregated set of findings, verdicts, and risk scores to create a single unified set of scan outcomes for the entire application package. This aggregated data provides the full set of issues and the overall level of risk determined from scanning the application package.

In some examples, a vulnerability found in both the source code and the container image are deduplicated and count as a single finding.

In some examples, the risk scores from all scans are combined to compute a total risk score for the application package as a whole. For example, risk scores from individual scans can be combined in various ways to determine an overall risk score for an application package. In some examples, the anti-abuse scan service 532 calculates a total risk score by summing the risk scores from all primary and secondary scans of the application package. In some examples, the anti-abuse scan service 532 determines a maximum risk score by selecting the highest risk score from among the set of primary and secondary scan risk scores. In some examples, a normalization process is applied to make risk scores more comparable if different scanners output scores on different scales. For example, the anti-abuse scan service 532 normalizes all scan risk scores to a common 0-10 scale before combining them. This normalization converts any raw risk scores to normalized scores on a 0-10 scale using min-max or z-score normalization techniques. After normalization, the anti-abuse scan service 532 can more accurately combine risk scores from different scanner tools by avoiding scale differences. The combined total risk score is then compared to configured risk thresholds to determine if the application package is automatically approved, automatically rejected, or requires further manual review.

In some examples, the correlation scanner identifies when files interact with each other through SQL queries to stored procedures or user defined functions, which would be impossible for an off-the-shelf tool to implement due to such a detection being heavily reliant on a proprietary SQL syntax of the data platform.

In some examples, a correlation scanner can further unpack tool-specific JSON outputs from detected verdicts into protobuf messages that defined per-scanner to get detailed information about that scanner's verdicts (e.g., a code snippet or line number where the verdict was detected). Combining all of this information lets the correlation scanner make a decision with more context.

In some examples, all verdicts output a confidence, where a low confidence detection is essentially 'ignored' (an application can still be automatically approved), a medium confidence triggers a manual review, and a high confidence triggers an automatic rejection.

In some examples, a set of existing rules generate medium confidence scores, with fewer amounts of low-confidence rules. A correlation scanner makes an automated decision more intelligent in several ways. In one way, multiple low-confidence rules that previously would have been automatically approved (due to being too noisy) can be combined to trigger a manual review or even automatic rejection. In another way, multiple medium-confidence rules that previously would have triggered manual review can be combined to automatically reject an application package if there is confidence that the multiple medium-confidence rules interact with each other in a meaningful way.

In some examples, a 'unit of work' is called a granular scan, and represents a single rule written for a single scanner running over a single file (or the entire application if the rule isn't file-specific). Logic to calculate all of the granular scans to run for an application are broken into "batches", where failures are retried and batches are adjusted dynamically as certain scans fail. In some examples, correlation scanners are implemented using scan batching and scheduling logic to track dependencies through a graph data structure, where all granular scans are stored as nodes in the graph, and edges are made to connect from a dependent (application/artifact) granular scan to a scan it depends on, such as a correlation scanner. Correlation scanners are put into batches after their dependencies have been scheduled to run, and are skipped if any of their dependencies have not completed by the time they are scheduled to run.

In some examples, correlation scanners are automatically marked as failed before being invoked if any of their dependencies permanently fail all retries or time out.

In operation 676, the anti-abuse scan service 532 determines an overall verdict for the application package based on the joined outcomes. For example, once the primary and secondary scan results are joined together, the anti-abuse scan service 532 determines an overall verdict for the application package. In some examples, the anti-abuse scan service 532 analyzes the aggregated risk score calculated across all scan results. This is compared to configured risk score thresholds to determine the verdict. In some examples, if the risk score does not exceed a predefined "minimum risk" threshold, the application package is automatically approved. However, if the risk score exceeds a predefined "maximum risk" threshold, the application package will be automatically rejected. If the risk score falls between the min and max thresholds, it would trigger a manual review by a human analyst.

In some examples, the anti-abuse scan service 532 also factors in any scan results that were manually approved or rejected in previous scans of this application package.

In operation 678, the anti-abuse scan service 532 updates the final approval or rejection status for the application package in the scan status database 602. For example, once the anti-abuse scan service 532 has determined the overall verdict for the application package, it stores the result in a datastore. In some examples, the anti-abuse scan service 532 updates the record for this application package scan in the scan status database 602, setting a STATUS field to APPROVED, REJECTED, or MANUAL_REVIEW_REQUIRED based on the verdict. In some examples, if approved or rejected, the anti-abuse scan service 532 also sets the APPROVAL_DATE, REJECTION_DATE, or REVIEW_DATE fields accordingly.

In some examples, anti-abuse scan service 532 also updates any other metadata like the risk score, number of findings, verdicts, or errors encountered during the scan. This provides a historical record of the scan results, verdict, and any other details that can be queried later.

Figure 7:
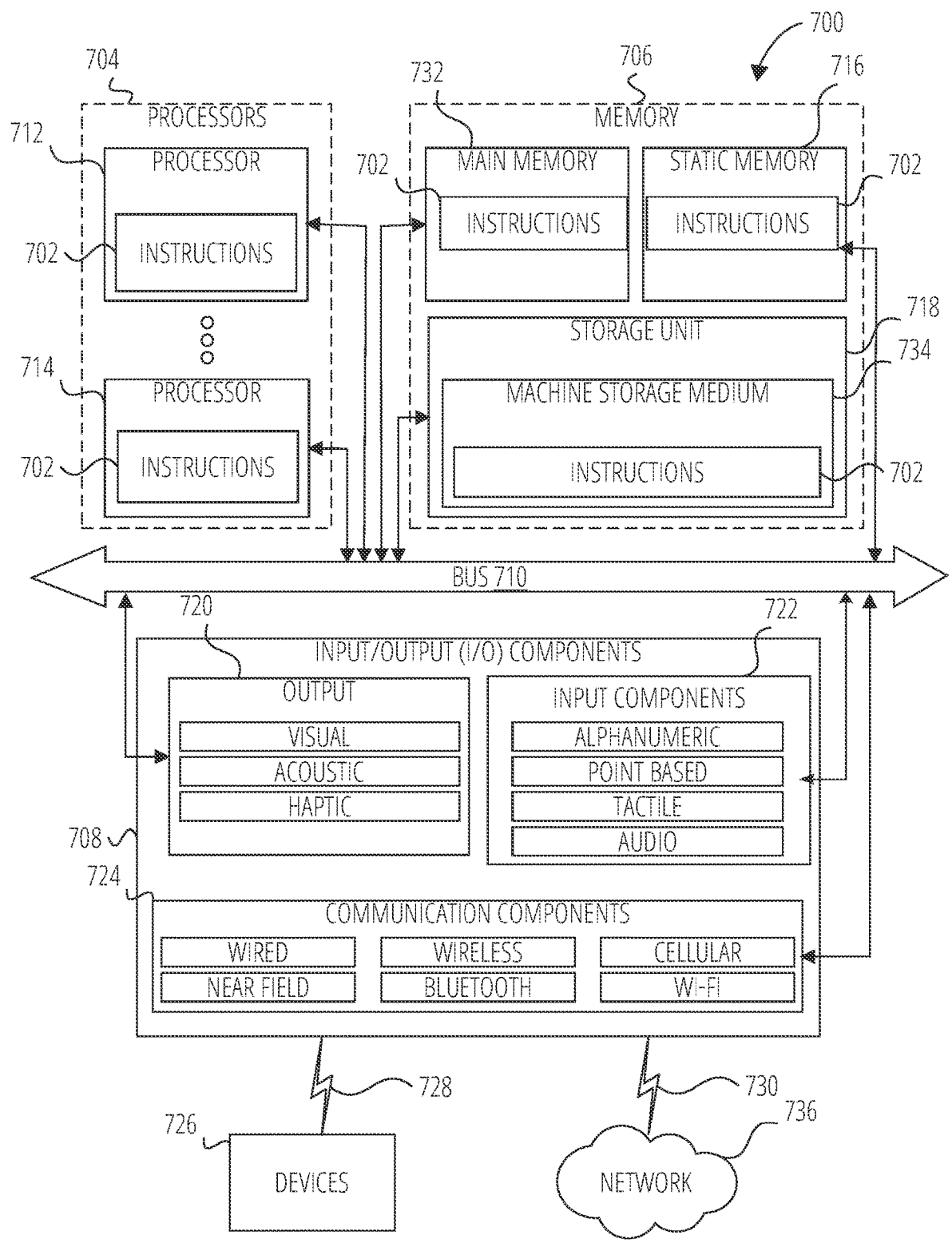
FIG. 7 illustrates a diagrammatic representation of a machine in the form of a computer system within which a set of instructions may be executed for causing the machine to perform any one or more of the methodologies discussed herein, in accordance with some examples.

FIG. 7 illustrates a diagrammatic representation of a machine 700 in the form of a computer system within which a set of instructions may be executed for causing the machine 700 to perform any one or more of the methodologies discussed herein, according to examples. Specifically, FIG. 7 shows a diagrammatic representation of the machine 700 in the example form of a computer system, within which instructions 702 (e.g., software, a program, an application, an applet, a data application, or other executable code) for causing the machine 700 to perform any one or more of the methodologies discussed herein may be executed. For example, the instructions 702 may cause the machine 700 to execute any one or more operations of any one or more of the methods described herein. In this way, the instructions 702 transform a general, non-programmed machine into a particular machine 700 (e.g., the compute service manager 104, the execution platform 110, and the data storage devices 1 to N of data storage 106) that is specially configured to carry out any one of the described and illustrated functions in the manner described herein.

In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 702, sequentially or otherwise, that specify actions to be taken by the machine 700. Further, while only a single machine 700 is illustrated, the term "machine" shall also be taken to include a collection of machines that individually or jointly execute the instructions 702 to perform any one or more of the methodologies discussed herein.

The machine 700 includes hardware processors 704, memory 706, and I/O components 708 configured to communicate with each other such as via a bus 710. In some examples, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 712 and a processor 714 that may execute the instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 may include a main memory 732, a static memory 716, and a storage unit 718 including a machine storage medium 734, all accessible to the processors 704 such as via the bus 710. The main memory 732, the static memory 716, and the storage unit 718 store the instructions 702 embodying any one or more of the methodologies or functions described herein. The instructions 702 may also reside, completely or partially, within the main memory 732, within the static memory 716, within the storage unit 718, within at least one of the processors 704 (e.g., within the processor's cache memory), or any suitable combination thereof, during execution thereof by the machine 700.

The input/output (I/O) components 708 include components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various examples, the I/O components 708 may include output components 720 and input components 722. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 708 may include communication components 724 operable to couple the machine 700 to a network 736 or devices 726 via a coupling 730 and a coupling 728, respectively. For example, the communication components 724 may include a network interface component or another suitable device to interface with the network 736. In further examples, the communication components 724 may include wired communication components, wireless communication components, cellular communication components, and other communication components to provide communication via other modalities. The devices 726 may be another machine or any of a wide variety of peripheral devices (e.g., a peripheral device coupled via a universal serial bus (USB)). For example, as noted above, the machine 700 may correspond to any one of the compute service manager 104, the execution platform 110, and the devices 726 may include the data storage device 226 or any other computing device described herein as being in communication with the data platform 102 or the data storage 106.

The various memories (e.g., 706, 716, 732, and/or memory of the processor(s) 704 and/or the storage unit 718) may store one or more sets of instructions 702 and data structures (e.g., software) embodying or utilized by any one or more of the methodologies or functions described herein. These instructions 702, when executed by the processor(s) 704, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g, erasable programmable read-only memory (EPROM), electrically erasable programmable read-only memory (EEPROM), field-programmable gate arrays (FPGAs), and flash memory devices, magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 736 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 730 may be a Code Division Multiple Access (CDMA) connection, a Global System for Mobile communications (GSM) connection, or another type of cellular or wireless coupling. In this example, the coupling 730 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 702 may be transmitted or received over the network 736 using a transmission medium via a network interface device (e.g., a network interface component included in the communication components 724) and utilizing any one of a number of well-known transfer protocols (e.g., hypertext transfer protocol (HTTP)). Similarly, the instructions 702 may be transmitted or received using a transmission medium via the coupling 728 (e.g., a peer-to-peer coupling) to the devices 726. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A method comprising:
    detecting, by one or more hardware processors, a dependency relationship between two or more primary scanners, the primary scanners for scanning an application of an application package of a data platform;
    scheduling, by the one or more hardware processors, the two or more primary scanners to execute based on the dependency relationship and generate primary scan results of scanning the application;
    determining, by the one or more hardware processors, completion of the scheduled execution of the two or more primary scanners; and
    in response to determining the completion, generating, by the one or more hardware processors, a correlation scan result that identifies correlation indicative of malicious content in the application using the primary scan results.

2. The method of claim 1, wherein the two or more primary scanners comprise different scanner types.

3. The method of claim 1, wherein the two or more primary scanners scan the entire application of the application package.

4. The method of claim 1, wherein the two or more primary scanners are associated with one or more secondary scanners that scan individual files of the application package.

5. The method of claim 1, further comprising:
    determining, by the one or more hardware processors, a failure of at least one of the two or more primary scanners; and
    in response to determining the failure, preventing, by the one or more processors, the generating of the correlation results.

6. The method of claim 1, wherein scheduling the two or more primary scanners comprises:
    identifying, by the one or more hardware processors, a dependency graph indicating the dependency relationship; and
    scheduling, by the one or more hardware processors, execution of the two or more primary scanners based on the dependency graph.

7. The method of claim 6, further comprising:
    updating, by the one or more hardware processors, a status of the dependency graph based on completion of at least one of the two or more primary scanners.

8. The method of claim 1, wherein the generating of the correlation scan results comprises:
    analyzing, by the one or more hardware processors, the primary scan results to identify correlations indicative of malicious content.

9. The method of claim 8, further comprising:
    generating, by the one or more hardware processors, a deployment decision for an application package based on the correlation scan results.

10. The method of claim 1, wherein the primary scan results comprise verdicts output by the two or more primary scanners, and
    wherein executing the generating of the correlation scan results comprises:
    identifying, by the one or more hardware processors, correlated verdicts; and
    determining, by the one or more hardware processors, a confidence score based on the correlated verdicts.

11. A machine comprising:
    at least one processor; and
    at least one memory storing instructions that, when executed by the at least one processor, cause the machine to perform operations comprising:
    detecting a dependency relationship between two or more primary scanners, the primary scanners for scanning an application of an application package of a data platform;
    scheduling the two or more primary scanners to execute based on the dependency relationship and generate primary scan results of scanning the application;
    determining completion of the scheduled execution of the two or more primary scanners; and
    in response to determining the completion, generating a correlation scan result that identifies correlation indicative of malicious content in the application using the primary scan results.

12. The machine of claim 11, wherein the two or more primary scanners comprise different scanner types.

13. The machine of claim 11, wherein the two or more primary scanners scan the entire application of the application package.

14. The machine of claim 11, wherein the two or more primary scanners are associated with one or more secondary scanners that scan individual files of the application package.

15. The machine of claim 11, wherein the operations further comprise:
    determining a failure of at least one of the two or more primary scanners; and
    in response to determining the failure, preventing the generating of the correlation results.

16. The machine of claim 11, wherein scheduling the two or more primary scanners comprises:
    identifying a dependency graph indicating the dependency relationship; and
    scheduling execution of the two or more primary scanners based on the dependency graph.

17. The machine of claim 16, wherein the operations further comprise:
    updating a status of the dependency graph based on completion of at least one of the two or more primary scanners.

18. The machine of claim 11, wherein the generating of the correlation scan results comprises:
    analyzing the primary scan results to identify correlations indicative of malicious content.

19. The machine of claim 18, wherein the operations further comprise:
    generating a deployment decision for an application package based on the correlation scan results.

20. The machine of claim 11, wherein the primary scan results comprise verdicts output by the two or more primary scanners and executing the generating of the correlation scan results comprises:
    identifying correlated verdicts; and
    determining a confidence score based on the correlated verdicts.

21. A machine-storage medium storing instructions that, when executed by a machine, cause the machine to perform operations comprising:
    detecting a dependency relationship between two or more primary scanners, the primary scanners for scanning an application of an application package of a data platform;
    scheduling the two or more primary scanners to execute based on the dependency relationship and generate primary scan results of scanning the application;
    determining completion of the scheduled execution of the two or more primary scanners; and
    in response to determining the completion, generating a correlation scan result that identifies correlation indicative of malicious content in the application using the primary scan results.

22. The machine-storage medium of claim 21, wherein the two or more primary scanners comprise different scanner types.

23. The machine-storage medium of claim 21, wherein the two or more primary scanners scan the entire application of the application package.

24. The machine-storage medium of claim 21, wherein the two or more primary scanners are associated with one or more secondary scanners that scan individual files of the application package.

25. The machine-storage medium of claim 21, wherein the operations further comprise:
    determining a failure of at least one of the two or more primary scanners; and
    in response to determining the failure, preventing the generating of the correlation results.

26. The machine-storage medium of claim 21, wherein scheduling the two or more primary scanners comprises:
    identifying a dependency graph indicating the dependency relationship; and
    scheduling execution of the two or more primary scanners based on the dependency graph.

27. The machine-storage medium of claim 26, wherein the operations further comprise:
    updating a status of the dependency graph based on completion of at least one of the two or more primary scanners.

28. The machine-storage medium of claim 21, wherein the generating of the correlation scan results comprises:
    analyzing the primary scan results to identify correlations indicative of malicious content.

29. The machine-storage medium of claim 28, wherein the operations further comprise:
    generating a deployment decision for an application package based on the correlation scan results.

30. The machine-storage medium of claim 21, wherein the primary scan results comprise verdicts output by the two or more primary scanners and executing the generating of the correlation scan results comprises:
    identifying correlated verdicts; and
    determining a confidence score based on the correlated verdicts.

* * * * *